(12) United States Patent
Farley et al.

(10) Patent No.: US 8,126,147 B2
(45) Date of Patent: *Feb. 28, 2012

(54) SECURE TERMINAL DATA LOADER SYSTEM AND IN-FLIGHT ENTERTAINMENT MANAGEMENT SYSTEM

(75) Inventors: Rodney Farley, Yorba Linda, CA (US); Joseph Renton, Yorba Linda, CA (US)

(73) Assignee: Systems and Software Enterprises, Inc., Anaheim, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 12/498,855

(22) Filed: Jul. 7, 2009

(65) Prior Publication Data

US 2010/0008503 A1  Jan. 14, 2010

Related U.S. Application Data

(63) Continuation of application No. 10/718,474, filed on Nov. 20, 2003, now Pat. No. 7,580,528.

(60) Provisional application No. 60/428,091, filed on Nov. 21, 2002.

(51) Int. Cl.
  *H04K 1/00* (2006.01)
(52) U.S. Cl. .............. 380/270; 726/27; 725/28; 725/62; 725/75; 725/76; 725/77; 455/41.3; 455/306; 455/431; 380/210
(58) Field of Classification Search ............. 380/270, 380/210; 726/27; 725/28, 62, 75, 76, 77, 725/81; 455/306, 431, 41.3
See application file for complete search history.

(56) References Cited

U.S. PATENT DOCUMENTS

| | | | |
|---|---|---|---|
| 6,438,468 B1 | 8/2002 | Muxlow et al. | |
| 6,529,706 B1 * | 3/2003 | Mitchell | 455/12.1 |
| 6,671,589 B2 | 12/2003 | Holst et al. | |
| 6,741,841 B1 * | 5/2004 | Mitchell | 455/188.1 |
| 6,757,712 B1 * | 6/2004 | Bastian et al. | 709/206 |
| 6,775,087 B2 | 8/2004 | Chan et al. | |
| 6,810,527 B1 * | 10/2004 | Conrad et al. | 725/76 |
| 6,816,728 B2 | 11/2004 | Igloi et al. | |
| 6,886,098 B1 | 4/2005 | Benaloh | |
| 7,035,585 B2 | 4/2006 | Forman et al. | |
| 7,035,634 B2 | 4/2006 | Mead et al. | |
| 7,065,216 B1 | 6/2006 | Benaloh et al. | |
| 7,213,268 B2 | 5/2007 | Stelling et al. | |
| 7,599,691 B1 * | 10/2009 | Mitchell | 455/431 |
| 2001/0024503 A1 | 9/2001 | Hatakeyama et al. | |
| 2002/0160773 A1 * | 10/2002 | Gresham et al. | 455/431 |
| 2003/0003872 A1 | 1/2003 | Brinkley et al. | |
| 2003/0009761 A1 * | 1/2003 | Miller et al. | 725/76 |
| 2003/0093798 A1 * | 5/2003 | Rogerson | 725/75 |
| 2004/0039497 A1 * | 2/2004 | Wood et al. | 701/4 |
| 2004/0078594 A1 | 4/2004 | Scott | |
| 2004/0167967 A1 * | 8/2004 | Bastian et al. | 709/206 |

FOREIGN PATENT DOCUMENTS

WO  01/06787  1/2001

* cited by examiner

*Primary Examiner* — April Shan
(74) *Attorney, Agent, or Firm* — Fish & Associates, PC

(57) ABSTRACT

A terminal data loading device on a mobile platform includes a media unit for receiving a transportable media element containing media data and outputting a media signal to a control processor unit. The control processor unit outputs an information signal to a wireline communication unit. The wireline communication unit outputs a wireline signal to a network on the mobile platform.

26 Claims, 9 Drawing Sheets

SECURE TERMINAL DATA LOADER SYSTEM AND IN-FLIGHT ENTERTAINMENT MANAGEMENT SYSTEM

CROSS-REFERENCE TO RELATED APPLICATIONS

This application is a continuation of co-pending U.S. application Ser. No. 10/718,474 filed Nov. 20, 2003 which claims the benefit of a provisional application Ser. No. 60/428,091 filed on Nov. 21, 2002 for a Terminal Data Loader. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

BACKGROUND OF THE INVENTION

1. Field of the Invention

The present invention relates to a data delivery system for a device on a mobile platform such as an aircraft, and more particularly pertains to a system and method for delivering secure data to a delivery device on a mobile platform that automatically delivers decrypted content to the mobile platform.

2. Description of Prior Art

Previously, a portable device was used to deliver data content to a mobile platform such as an aircraft. This portable device performed a loading function that transfers data from the portable device to one or more devices on the aircraft. This was not advantageous because it required the portable loader to remain on the aircraft for an extended period until the transfer of data from the loader device to the aircraft devices was completed. The data loaded onto the aircraft system could include in-flight entertainment (IFE) content such as movies, which can include very large quantities of data that may transfer relatively slowly.

Since the data delivery system was portable, it was also more likely to be damaged during transit on and off the aircraft, or by the repeated making and breaking of the electrical connection between a portable loader and the platform system.

Aside from the difficulties associated with the data transfer, another significant problem relates to the inability of an in-flight entertainment (IFE) manager to know the status of the content delivery to the fleet of aircraft on a timely basis. Further, some data content requires security measures to protect it during transfer from the content provider to the content users on the aircraft.

There is a need to provide a permanently installed data delivery device that overcomes the problem of having to carry a heavy but delicate delivery device while maintaining adequate security for the delivered data content.

SUMMARY OF THE INVENTION

A permanently installed Terminal Data Loader (TDL) for loading data content aboard a mobile platform such as an aircraft overcomes these disadvantages. Only a cryptographically secure media element is transportable while the TDL remains permanently installed aboard the aircraft. The TDL can be removed from the aircraft in order to perform diagnostics, maintenance, and repair.

One or more media units for reading and writing on transportable media elements can be used including optical media such as a Digital Versatile Disk (DVD), Compact Disc (CD), magnetic media such as an Advanced Intelligent Tape (AIT-2/4/6), and solid-state media including one or more memory sticks, for example. Each of these media elements has various capacities and advantages. Other media elements may be utilized which conform to the use and transportation as herein described.

In a first embodiment, a TDL device, permanently installed on a mobile platform, includes a media unit that receives a removable media element in order to read the information from the media element and output a media signal representing information stored on the media element. The media unit is operatively connectable to the received media element. Alternatively, the media unit can receive a media signal and write media data to the media element.

A control processor receives the media signal from the media unit, processes the media signal, and outputs an information signal that corresponds to the received media signal. Alternatively, the control processor unit can receive an information signal and produce a media signal. Processing includes collecting portions of the media signal into delivery blocks of a predetermined size.

A wireline communication unit can receive the information signal from the control processor and output a wireline signal to a network on the mobile platform. The wireline communication unit translates the information signal into a wireline signal corresponding to the information signal. Alternatively, the wireline communication unit can receive a wireline signal and produce an information signal.

In a second embodiment, a TDL device, permanently installed on a mobile platform, includes a media unit that receives a removable media element containing encrypted information and outputs an encrypted media signal representing information stored on the media element. A security processor unit receives the encrypted media signal, processes the encrypted media signal, and outputs a decrypted or unencrypted media signal. Alternatively, the security processor unit can receive an unencrypted media signal and produce an encrypted media signal. Security processing can include both decryption of the encrypted media signal as well as encryption of the unencrypted information signal to produce an encrypted media signal based on a predetermined decryption algorithm and one or more associated cryptographic keys.

A control processor receives the unencrypted media signal from the security processor unit, processes the unencrypted media signal, and outputs an information signal that corresponds to the received encrypted media signal. Alternatively, the control processor unit can receive an information signal and produce an unencrypted media signal. A wireline communication unit receives the decrypted information signal from the control processor and outputs a wireline signal to a network on the mobile platform.

In a third embodiment, a TDL device, permanently installed on a mobile platform, includes a wireless communication unit that allows the TDL to communicate over a wireless network in order to send and receive messages containing commands and data to and from wireless network resources. The commands and data comprise an information signal to and from the control processor unit. The wireless communication unit can communicate with an Internet Service Provider (ISP) in order to access the internet, including e-mail. The internet e-mail can be used to send and receive cryptographic key information.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein.

DETAILED DESCRIPTION OF THE PREFERRED EMBODIMENTS

The present invention provides a permanently installed, high data capacity cryptographically secure Terminal Data Loader (TDL) device for receiving a transportable media element and delivering information content to users in a variety of mobile platforms including, but not limited to, one or more passenger aircraft, tour busses, trains, motor homes, cruise ships, or automobiles. In one embodiment, for application on a passenger aircraft, the TDL can upload data to file servers and media servers as well as download data from file servers and media servers in a variety of ways both while in flight and on the ground. The TDL can decrypt protected content in real time as it is read from removable media so that movies and other content do not need to be transported to the aircraft unsecured. Content remains encrypted from the time it leaves the content generating facility until it is safely read by the TDL.

Figure 1:
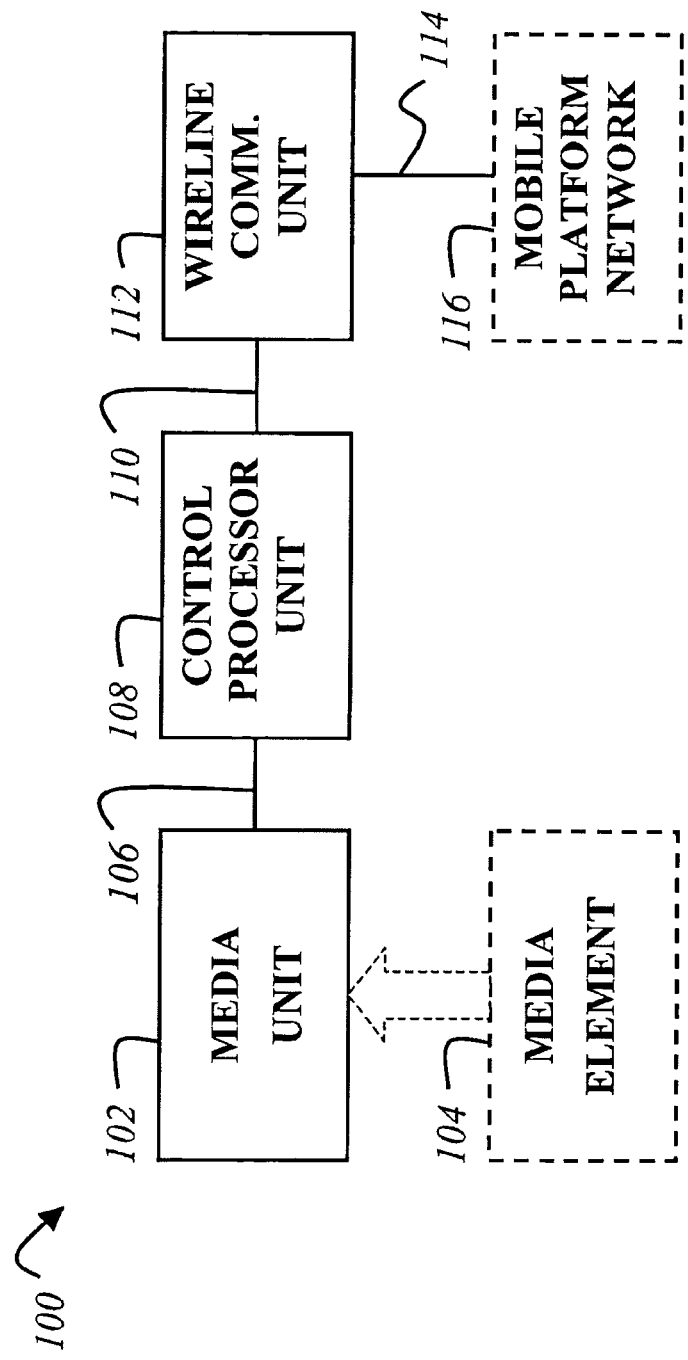
FIG. 1 is a block diagram of an embodiment of the Terminal Data Loader device for use with non-encrypted media data.

FIG. 1 is a block diagram of a first embodiment of the TDL 100 device for use with non-encrypted media data. In this embodiment, a media unit 102 can receive a removable, transportable media element 104 that contains unencrypted media data. The media unit 102 is operatively connectable to the received media element 104. The media data can be read from the media element 104 by the media unit 102 to produce a media signal 106. The media signal 106 corresponds to the information contained on the media element 104. Alternatively, the media unit 102 can receive a media signal 106 and write media data to the media element 104.

The media signal 106 is passed to the control processor unit 108 which produces an information signal 110. The information signal 110 corresponds to the processed media signal 106. Alternatively, the control processor unit 108 can receive an information signal 110 and produce a media signal 106. Processing can include collecting portions of the media signal 106 into delivery blocks of a predetermined size. The information signal 110 is passed to a wireline communication unit 112 which outputs a wireline signal 114 to a mobile platform network 116. Alternatively, the wireline communication unit 112 can receive a wireline signal 114 and produce an information signal 110. The wireline communication unit 112 can be an Ethernet device, a Fibre Channel device, a token ring device, a universal-serial-bus (USB) device, or a serial communication device that conforms to an accepted standard. The wireline communication unit 112 can alternatively be a local area wireless connection such as one, for example, that is compliant to the Institute of Electrical and Electronics Engineers (IEEE) standard 802.11. This alternative is drawn to only the mobile platform network 116 and cannot communicate beyond the mobile platform network 116. The TDL 100 can thus be used to on-load data from the transportable media element 104 onto a resource attached to the mobile platform network 116. Alternatively, the TDL 100 can be used to off-load data from the mobile platform network 116 to a transportable media element 104.

Figure 2:
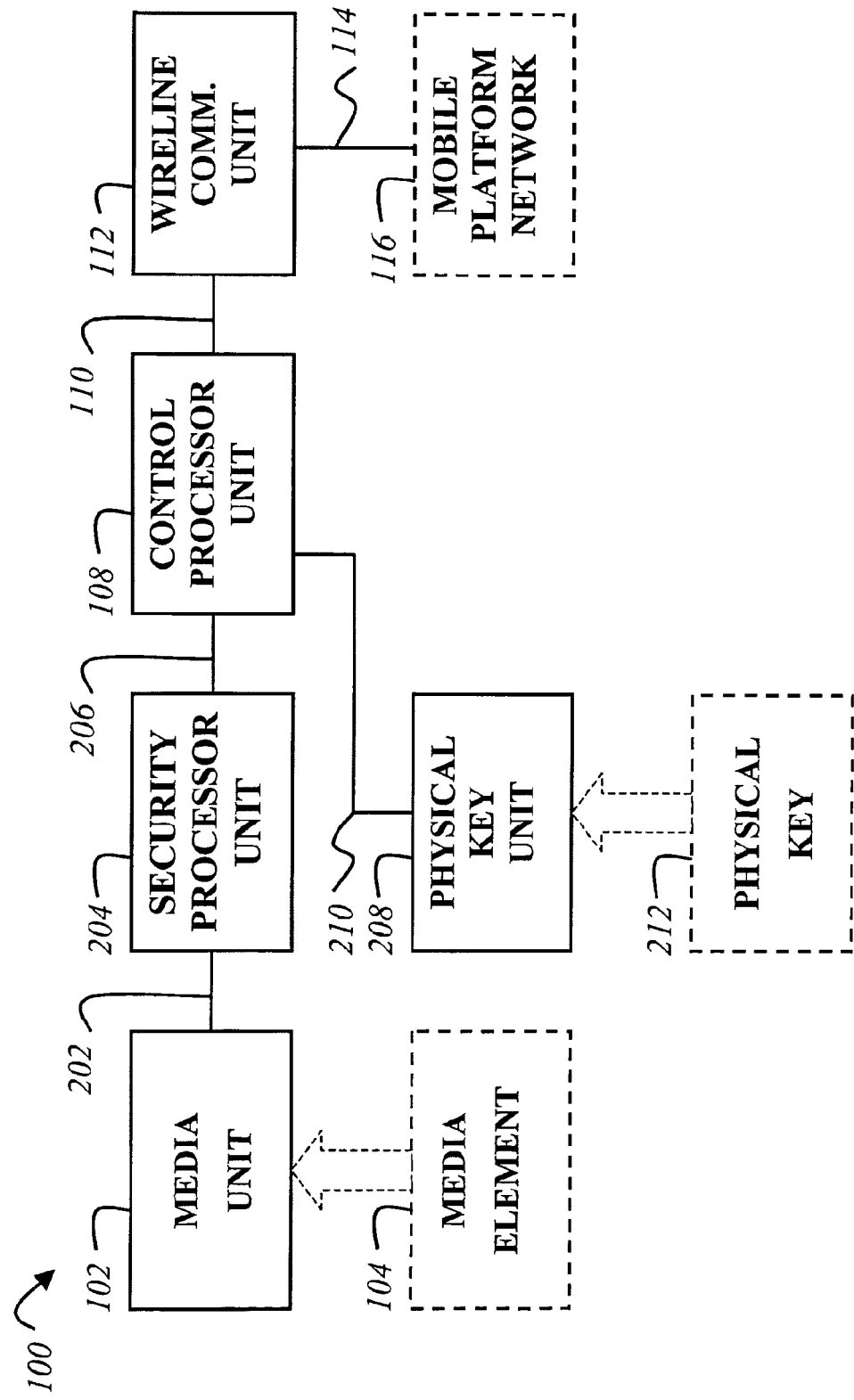
FIG. 2 is a block diagram of an embodiment of the Terminal Data Loader device for use with encrypted media data.

FIG. 2 is a block diagram of a second embodiment of the TDL 100 for use with encrypted media data. Although similar to the embodiment of FIG. 1 in some respects, the embodiment of FIG. 2 also includes a security processor 204 for use with encrypted media data. In this embodiment, the media unit 102 receives a removable, transportable media element 104 that contains encrypted media data. The encrypted media data is read from the media element 104 by the media unit 102 to produce an encrypted media signal 202. The encrypted media signal 202 corresponds to the encrypted information contained on the media element 104.

The encrypted media signal 202 is passed to the security processor unit 204 which produces an unencrypted media signal 206. The unencrypted media signal 206 corresponds to the security processed encrypted media signal 202. Security processing includes decryption of the encrypted media signal 202 based on a predetermined decryption algorithm and one or more associated cryptographic keys. Conversely, security processing also includes encryption of the unencrypted media signal 206 into an encrypted media signal 202.

The control processor unit 108 interfaces with a physical key unit 208 that receives a physical key 212. The physical key unit 208 produces encryption and decryption key information 210 using physical key 212. The encryption and decryption key information 210 is passed to the security processor unit 204. The physical key 212 preferably conforms to the physically secure Federal Information Processing Standards (FIPS) Publication 140-1, level-2 compliant hardware device to perform authentication and encryption key storage.

The security processor unit 204 uses the encryption and decryption key information 210 to decrypt the encrypted media signal 202 according to a predetermined decryption algorithm in order to produce the unencrypted media signal 206 which comprises the media data. The media data is protected using cryptographic techniques so that, if the removable media is obtained by an unauthorized person, the content of the media data is not accessible.

The cryptographic techniques preferably comply with the Data Encryption Standard (DES) protocol, the Triple-DES (3DES) protocol, the Advanced Encryption Standard (AES), or other established security protocols. The cryptographic techniques employed can comply with symmetric or asymmetric (public key) protocols. Asymmetric key protocols can be used to securely exchange symmetric keys for use in encrypting and decrypting content.

The unencrypted media signal 206 is passed to the control processor unit 108 that produces an information signal 110. The information signal 110 corresponds to the processed unencrypted media signal 206. Processing includes collecting portions of the unencrypted media signal 206 into delivery blocks of a predetermined size. The information signal 110 is passed to a wireline communication unit 112 that outputs a wireline signal 114 to the mobile platform network 116. Parsing the unencrypted media signal 206 into blocks of a predetermined size can facilitate the use of block-cipher protocols as well as other advantages include limiting the bandwidth required for transfers in the presence of other network devices. Alternatively, the wireline communication unit 112 can receive a wireline signal 114 from the mobile platform 116 and output an information signal 110. The control processor unit 108 receives the information signal 110 and produces an unencrypted media signal 206 which is passed to the security processor unit 204. The security processor unit 204 receives the unencrypted media signal 206 and produces an encrypted media signal 202 which is passed to the media unit 102. The media unit 102 then writes the encrypted media signal to the media element 104 as encrypted media data. The media element 104 is operatively connected to the media unit 102.

Encrypted content is decrypted and transferred to a server on the mobile platform network while unencrypted content, so called "in the clear" or "plain text" content, is transferred directly to the mobile platform server. The encrypted content will only be in the clear when it is stored on a mobile platform server. Although the first and second embodiments just described refer to unencrypted and encrypted media data, respectively, the media data contained on a particular media element 104 may actually contain both encrypted and unencrypted data. Since some of the content includes theatrical content such as movies for in-flight entertainment, content can be encrypted and decrypted in compliance with the Motion Picture Association of America (MPAA) guidelines. A server on the mobile platform network reassembles the media data content into one or more complete files for use on the mobile platform.

Figure 3:
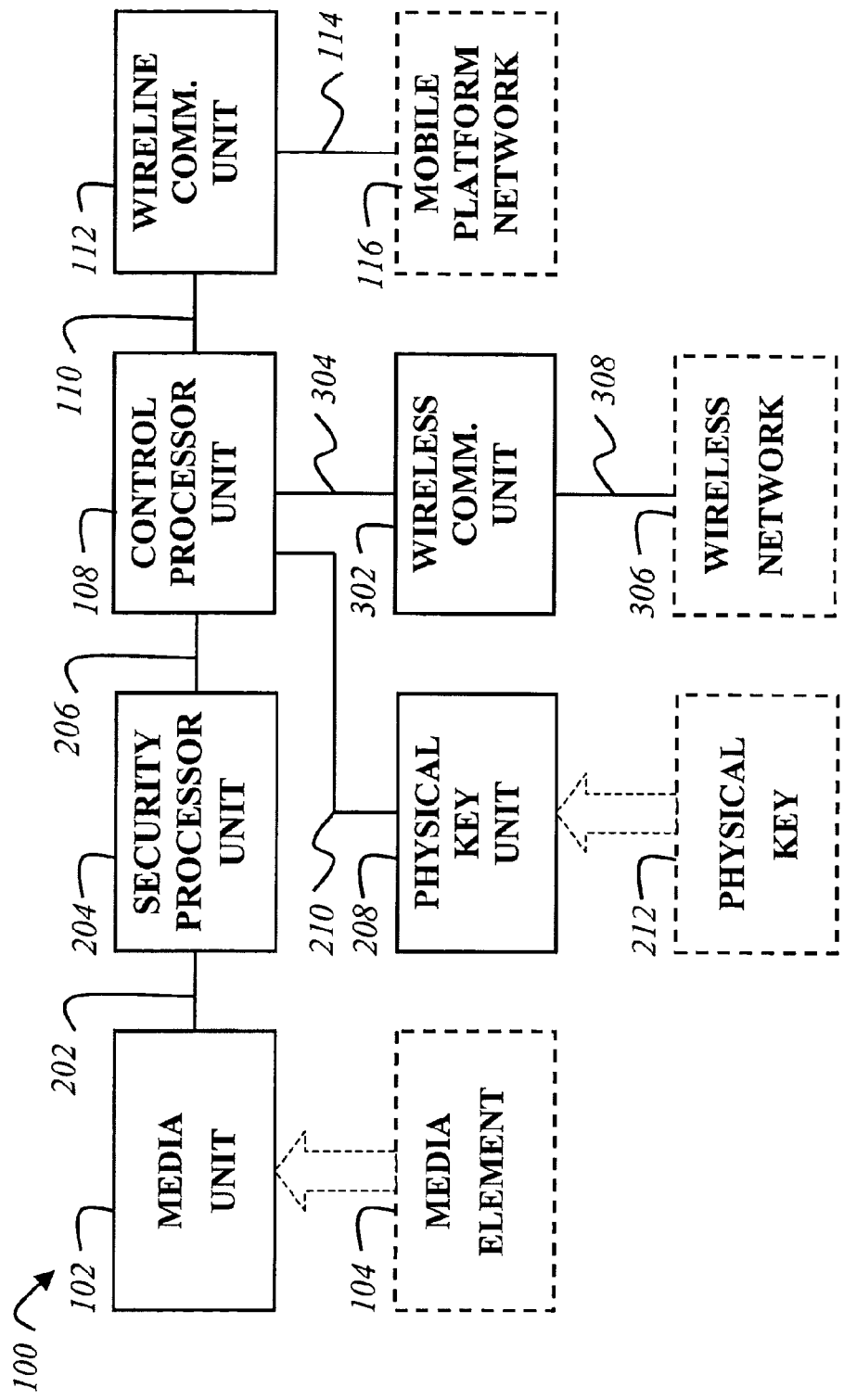
FIG. 3 is a block diagram of an embodiment of the Terminal Data Loader device for use with a wireless network.

FIG. 3 is a block diagram of a third embodiment of the TDL device for use with a wireless network. Further to the embodiment of FIG. 2, the embodiment of FIG. 3 includes a wireless communication unit that interacts with a wireless network. The TDL communicates with an internet service provider that is accessible to the mobile platform to access command and data information. The wireless communication unit 302 receives an information signal 304 from the control processor unit 108 and sends a wireless signal 308 to a receiving wireless communication unit over a wireless network 306.

Alternatively, the wireless communication unit 302 receives a wireless signal 308 from the wireless network 306 and translates the wireless signal with the wireless communication unit 302 into an information signal 304 that is sent to the control processor unit 108. The information signal 304 comprises messages to and from the TDL including sent and received cryptographic keys, requests for information, response to requests for information, operational health and status, and e-mail, for example.

The TDL receives a transportable media element 104 and delivers information content to and receives information from the mobile platform. When data is being loaded onto the TDL device from a transportable media element 104, that data is considered on-loading information. Conversely, when the TDL receives a transportable media element 104 and data is being written from the TDL to the transportable media element 104, that data is considered to be off-loading information. The on-loading data can be in-flight entertainment for an aircraft including but not limited to digital content such as encrypted motion picture experts group (MPEG) files, MPEG Layer 3 (MP3) audio files, poster images such as informational signs with elemental components, menus for title and synopsis lists, exhibition profile lists for content based on licensing of the content, and content decryption keys.

The on-loading data can be entertainment content including but not limited to broadcast text messages, games and surveys, airline customer information, intranet web pages, and integrated pre-recorded announcements in various languages. The on-loading information contained in the transportable media can also be related to the operation of the mobile platform such as crew notices and instruction manuals for the aircraft, passenger information regarding meal selections, allergies to foods, or other special requirements and information. The on-loading information can also include in-flight entertainment applications or application updates to the TDL or other system on the mobile platform connected via the mobile platform network 116.

Figure 4:
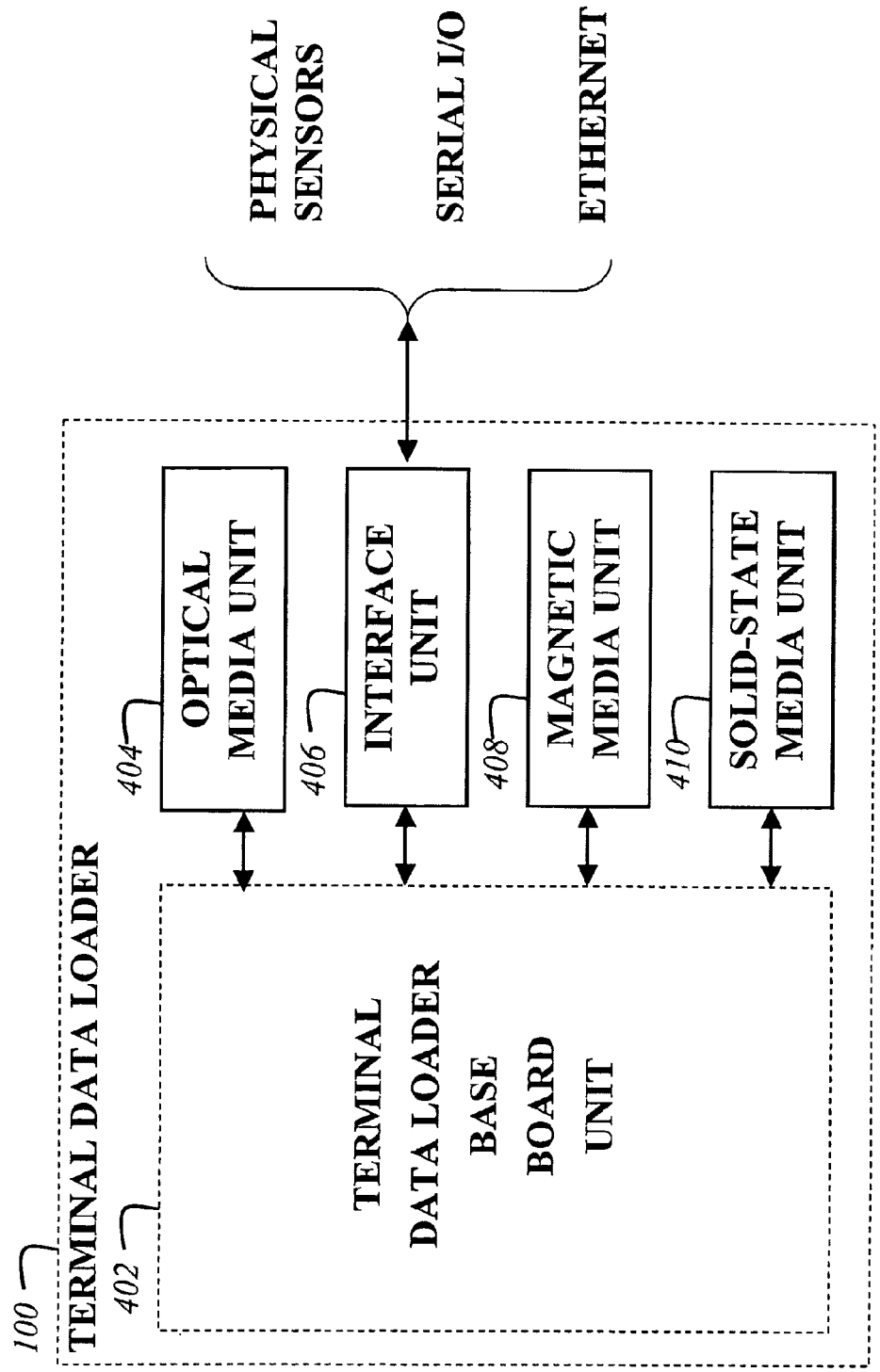
FIG. 4 is a block diagram of an embodiment of the Terminal Data Loader device showing the media units.

In reference to FIG. 4, the TDL can also off-load data by writing to a writeable, transportable media element 104 such as a Read/Write optical disc in the optical media unit 404, a magnetic tape in the magnetic media unit 408, or solid-state media in a solid-state media unit 410. The solid-state media element can be a memory-stick, a random access memory unit (RAM), or some other storage device without moving parts, while the solid-state media unit is a device for reading data from and optionally writing data to a corresponding solid-state media element. Information off-loaded from the mobile platform can include, but is not limited to, content usage data such as movie file, audio file, and game usage. Off-loading data can include web-server logs, survey results, a duty-free manifest and customer selections for preparation after the aircraft arrives at a destination.

For example, the customer selections can be automatically sent upon gate arrival to a vendor in the arrival airport so that the vendor can assemble purchased items for the passenger to pick up after departing the aircraft. The off-loading data may include a transaction database for items purchased during the trip, electronic customs declaration forms filed out while on the aircraft, passenger arrival messages customized depending on a particular passenger's preferred language profile as detailed in a passenger information listing.

Off-loading data can also include aircraft system related information such as logs of built-in-test (BIT) operations performed, built-in-test-equipment (BITE) logs, hardware and software version information regarding the TDL or other interconnected resources in the aircraft, aircraft maintenance records, an advance equipment failure list, and equipment profile information such as the mean-time-between-failure (MTBF) and mean-time-before-unscheduled-replacement (MTBUR) data for the TDL or other equipment on the aircraft.

The TDL can collect and off-load flight information such as time on the ground, time at the gate, crew orders, accident reports, and other records. The TDL can collect and off-load surveillance data gathered by distributed audio and video or other physical sensors for use in documenting evidence regarding allegations of air-rage or other disruptions during flight.

A high to low volume of data can be uploaded to the TDL from a media unit operably connected to a corresponding media element. The optical media unit can be a DVD unit or a CD unit, or can be some other type of medium that reads and writes information optically. The solid-state media unit can be a memory stick unit for receiving a solid-state memory or other high to low capacity storage medium that reads and write information to a solid-state memory storage unit. The magnetic media unit can be an AIT unit, or other high to low capacity storage medium that reads and writes information magnetically. The TDL is preferably permanently mounted in the mobile platform and the media elements are transported to and from the TDL. The TDL may be removed from the mobile platform for diagnostics, maintenance, and repair.

In reference to FIG. 4, the TDL includes an optical media unit 404, a interface unit 406, a magnetic media unit 408, a solid-state media unit 410, and a TDL base board unit 402. Typically, an AIT tape can be used to transport a high volume of data, such as 50 GB or more. A DVD/CD or memory stick is used to transport an intermediate volume of data, such as 700 MB to 8.5 GB. Data is written onto writeable media by the TDL 100 in order to offload data from the aircraft. The TDL base board unit 402 is one or more printed circuit boards. The interface unit 406 includes various components for use in isolating sensitive electronic components from the external environment such as electrostatic discharge (ESD) protection components and optical isolation elements to eliminate unwanted crosstalk, for example.

Figure 5:
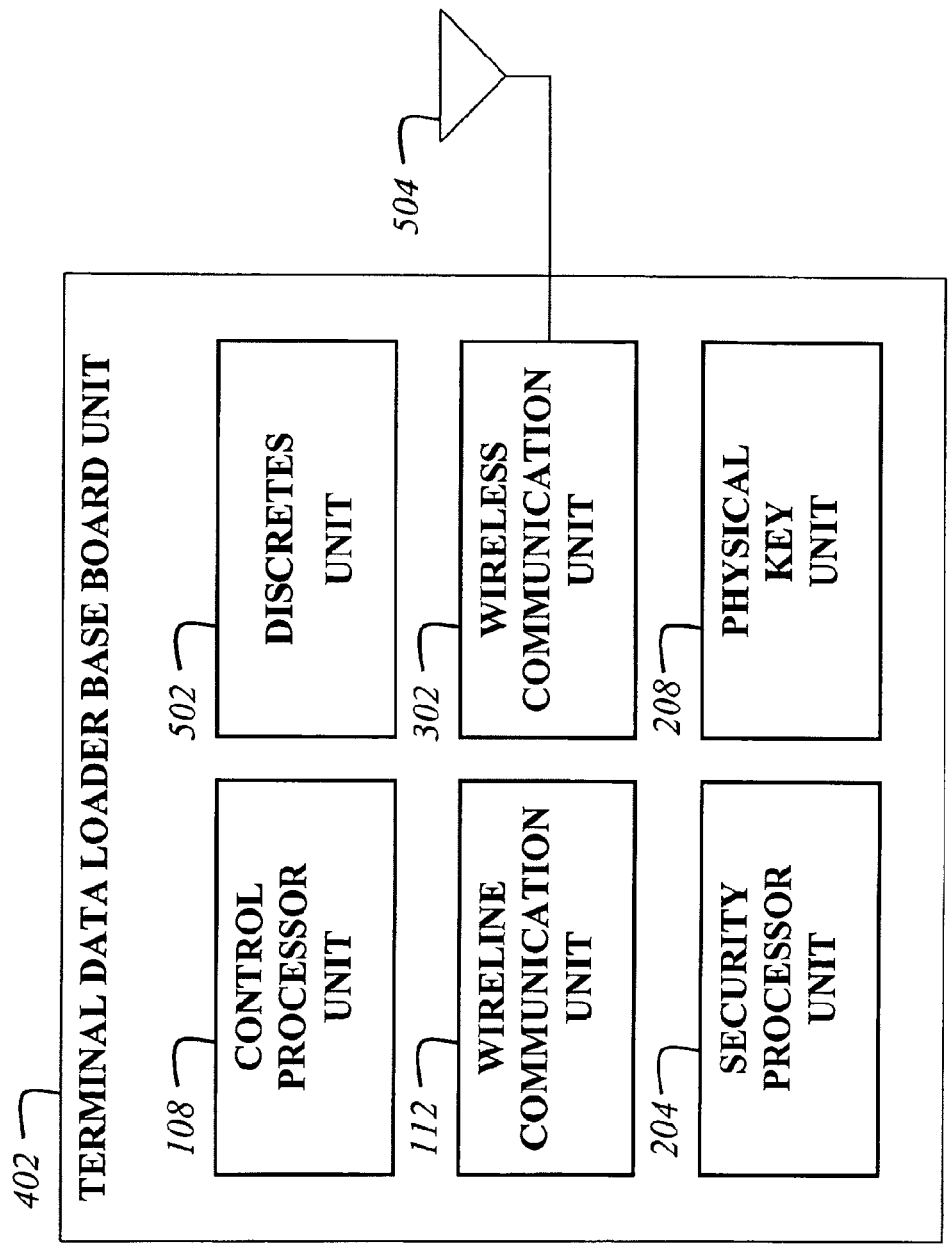
FIG. 5 is a block diagram of the Terminal Data Loader Base Board Unit included within the Terminal Data Loader system.

In reference to FIG. 5, the TDL base board unit 402 includes a control processor unit 108, a discretes unit 502, a wireline communication unit 112, a wireless communication unit 302 that interfaces with an antenna 504, a security processor unit 204, and a physical key unit 208. These units can be implemented individually as modules or as discrete components suitably arranged and interconnected to perform the described functions.

The control processor unit 108 preferably includes a single-board computer with solid-state memory such as a random access memory (RAM) and bootable flash memory, but without a rotating, magnetic hard disk drive (HDD). This reliance on solid-state components increases the reliability of the TDL 100. The control processor unit 108 includes at least one Universal Serial Bus (USB) port for interfacing with the solid-state media, and at least two Enhanced Integrated Drive Electronics (EIDE) ports for interfacing with the optical media unit 404 and the magnetic media unit 408 respectively.

The control processor unit 108 is programmed to implement various software based applications and with sub-programs or drivers to facilitate their operation as herein described. For example, the control processor unit 108 implements various software interfaces such as the Transmission Control Protocol/Internet Protocol (TCP/IP), File Transfer Protocol (FTP), Point-to-Point Protocol (PPP), or direct Simple Mail Transfer Protocol (SMTP) for communication on and off the mobile platform. The software interface can include an Application Program Interface (API) that provides access to supported network services.

The discretes unit 502 includes circuitry to detect and report external conditions detected by physical sensors, such as an "at gate" signal, whether the door of the aircraft is open or the aircraft parking brake is set, for example. The operational mode of the TDL 100 depends on the various internal and external conditions as well as the type of operation that is requested or pending. Preferably, the operation of the TDL 100 is automatic where a media element 104 is inserted into a media unit 102 and the reading, decrypting, and storing of the loaded content to a shared server on the mobile platform can be accomplished automatically.

The wireline communication unit 112 can include a serial port such as a RS-232/422/485, a network port such as a 100/10-Base-T Ethernet, a Fibre Channel port, a USB port, or a token-ring port, and may be integrated together with the control processor unit 108 or upon the base board 402. These various types of ports allow flexibility for the TDL 100 to be available as a resource on the mobile platform network.

The wireless connection unit 302 allows the TDL to reliably exchange information with resources on the internet thereby allowing an in-flight entertainment (IFE) manager to monitor and control the delivery of content in nearly real-time. For example, the IFE manager can use a web-based internet system to determine the delivery status of the information content on each aircraft and initiate changes such as cryptographic key updates, programming changes, etc. The combination of end-to-end content encryption, real-time hardware decryption on the aircraft, and automated and secure key management allows IFE managers to easily manage the delivery of content to a mobile fleet.

The wireless communication unit 302 is used to transport data over a relatively low-bandwidth cellular channel. The wireless connection is preferably a tri-band (900, 1800, and 1900 MHz) cellular data link such as the Global System for Mobile (GSM) Communications including Circuit Switched Data (CSD) and General Packet Radio Service (GPRS) capabilities that supports voice, data, fax, and Short Message Service (SMS) protocols. The wireless link provides worldwide, bi-directional internet access to the aircraft when conditions permit activating the wireless link such as when the aircraft is parked at the terminal gate, the parking brake is set, or a cabin door is open, for example.

The four data transfer modes described; tape, disc, solid-state, and wireless have obvious advantages. It is beneficial to include all these modes since the various types of content that may be on-loaded or off-loaded is flexibly transported using an appropriate mode depending on the size of the data, the frequency of distribution, and the urgency of the on-loading and off-loading requirements. Other media units may be utilized such that the transportable media element itself does not contain any electronic or other components such that the transportable media element would be subject to certification under an airworthiness certification such as described in conjunction with the U.S. Federal Aviation Administration (FAA) 8130-6, or other similar certification to verify the transportable media will not cause harmful interactions with the aircraft. The TDL 100 itself can be certified for installation aboard an aircraft. These certifications include RTCA D0160D, Boeing SCSRD D6-36440 rev C, Airbus 4640 M1F001 00, Airbus TN-ESK-011/27.07.00, and others. Since the transportable media element 104 is not subject to certification, it can be easily transported on and off the aircraft.

The security processor unit 204 can be a stand-alone encryption and decryption engine such as a Motorola MPC 184 Security Processor, or the cryptographic functionality may be integrated together with the control processor unit 108 or other appropriately programmed general purpose computer. The security processor unit 204 is preferably a stand-alone unit, separate from the control processor unit 108, in order to more effectively implement real-time decryption of encrypted content without overburdening the control processor unit 108. The TDL 100 employs cryptographic techniques to secure and authenticate communications with external networks as well as validate the content contained on an inserted media element 104 and any compatible, encrypted or signed message received.

The physical key 212 is preferably a hardware token that includes circuitry that can be used to produce private and public cryptographic key pairs when requested by the control processor unit 108 through the physical key unit 208. The public key is exported from the physical key 212 while the private key is never exported. When the physical key 212 interfaces with the physical key unit 208 it is considered part of the circuitry of the TDL 100.

The physical key 212 is used to uniquely identify a particular TDL 100 from a secure communications standpoint. If a TDL 100 device is found to be defective it may be replaced with a functional TDL 100 by a field technician as a Line Replaceable Unit (LRU). The physical key 212 is then transferred to the replacement TDL 100 so that the cryptographic keys generated with the physical key 212 will continue to be valid with the corresponding media elements 104. The physical key 212 can be an Aladdin eToken Pro that supports 1024-bit Public Key Infrastructure (PKI) technology including key generation.

The physical key 212 is removable and is preferably located unobtrusively on the rear portion of the TDL 100 away from reach by a manager or passenger until the TDL 100 unit is removed from its mounting place by a field technician. The flexibility of transferring the physical key 212 from one TDL 100 to another ensures rapid usability of a replacement TDL 100 and reduces potential down-time.

Figure 6:
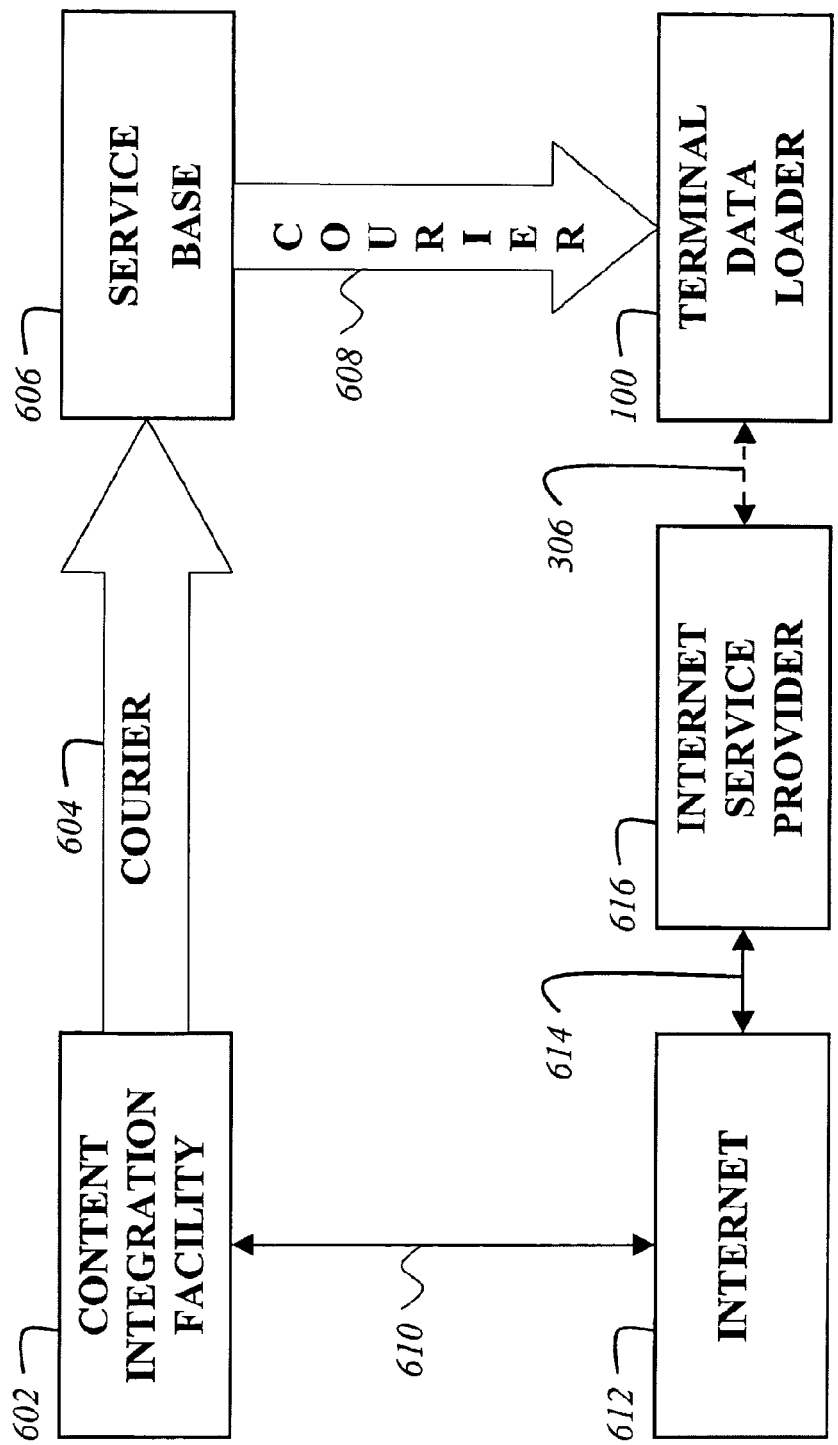
FIG. 6 is a block diagram flow chart of the content preparation and delivery process.

In reference to FIG. 6, the content preparation and delivery process is described. The content delivery modes can be classified as either electronic or non-electronic. For non-electronic distribution, a content integration facility 602 produces a media element 104 containing media data to be sent by a courier 604 to a service base 606. The service base 606 collects one or more media elements 104 for use on one or more aircraft or other mobile platforms and is preferably local to the terminal where the mobile platform stops to take on or let off passengers. From the service base 606 a courier 608 delivers a specified media element 104 to a particular TDL 100 on a particular mobile platform. A courier (604, 608) can include any non-electronic distribution system of the transportable media element 104 including a parcel delivery service, maintenance staff member, or airline employee, for example.

For electronic distribution, a content integration facility 602 produces a content message that is preferably sent over an electronic network 610 to the internet 612. The content message can be an e-mail message or can be a file that is stored in a predetermined location. A TDL 100 can retrieve the content message by accessing an Internet Service Provider (ISP) 616 over a wireless network. The ISP 616 is preferably local to the mobile platform and enables the TDL 100 to make a connection to the internet 614 to retrieve any pending messages for the particular TDL 100 that is making the request to retrieve a message or to upload status, for example.

Figure 7:
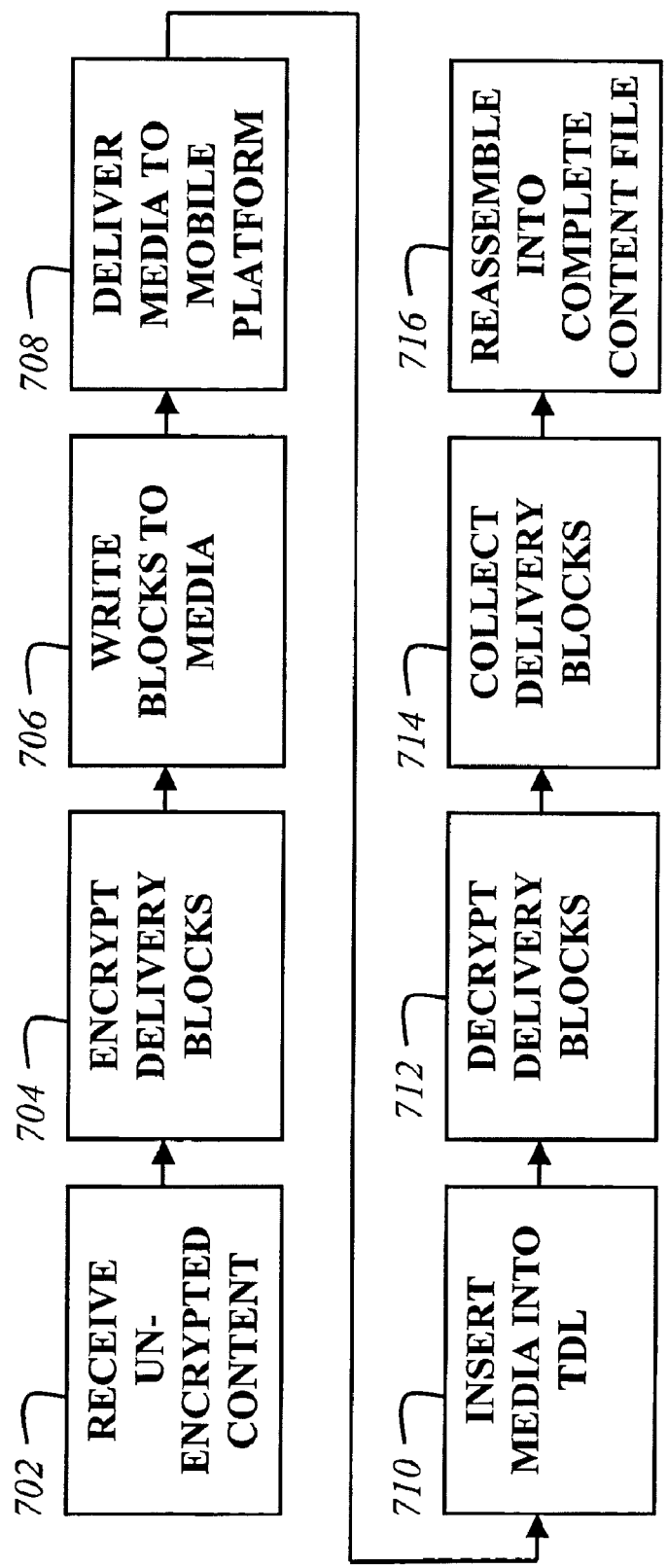
FIG. 7 is a flow chart of the content encryption and decryption process.

In reference to FIG. 7, the content encryption and decryption process describes how a media data content file is processed and transported from beginning to end. First a possibly large media data content file is received in a receive unencrypted content 702 step. In many cases, an encryption algorithm will require that the plain text data input for encryption be composed in a block of a predetermined size prior to encryption or decryption.

The unencrypted content is encrypted in an encrypt delivery blocks 704 step. The encrypted delivery blocks are written to the media element 104 in a write blocks to media 706 step. The media element 104 containing the encrypted delivery blocks is transported to a particular mobile platform in a deliver media to mobile platform step 708. The media element 104 is inserted into the particular TDL in the insert media into TDL 710 step. The delivery blocks on the inserted media element 104 are decrypted by the TDL in the decrypt delivery blocks 712 step.

The decrypted delivery blocks are electronically transmitted from the TDL to a media server connected to the TDL on the mobile platform network 116 where the delivery blocks are collected in a collect delivery blocks 714 step. Finally, the collected delivery blocks are reassembled into a complete content file, corresponding to the initial content file, in the reassemble into complete content file 716 step.

Figure 8:
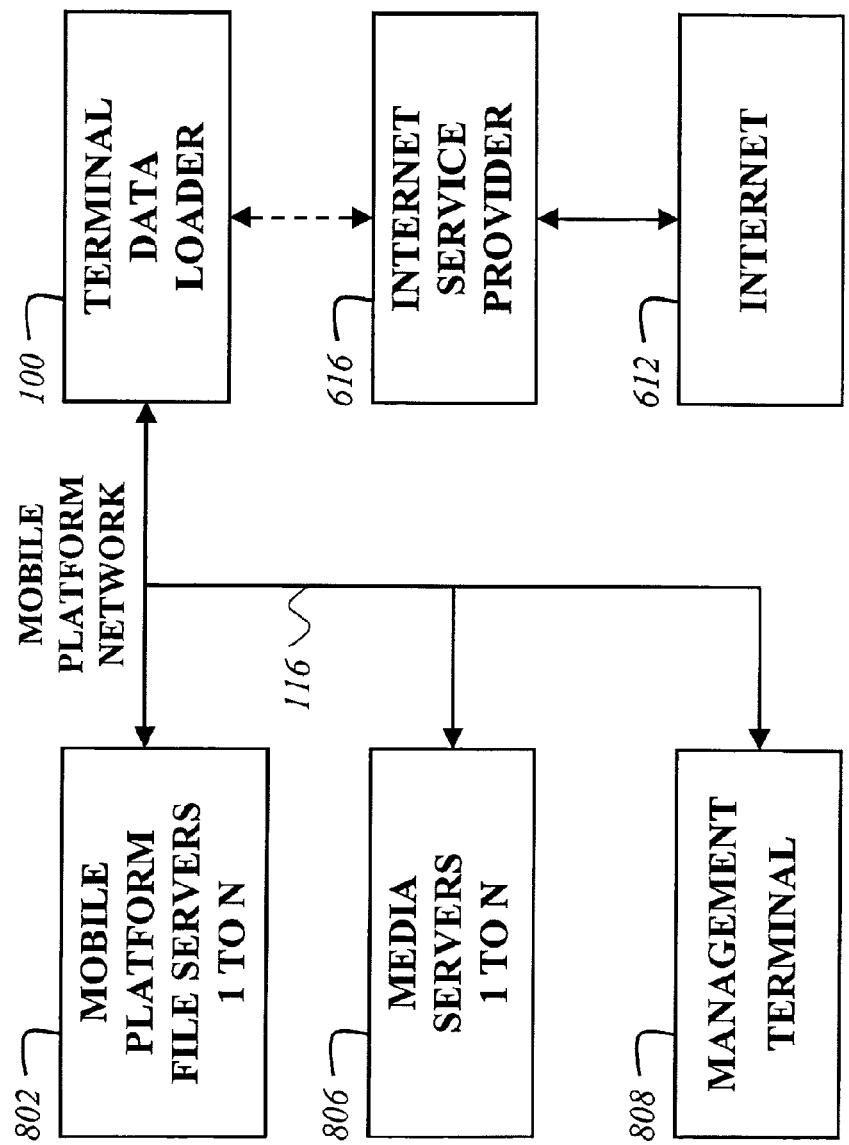
FIG. 8 is a block diagram of the local network interface with the Terminal Data Loader including one or more file servers, one or more local media servers, and a management terminal.

In reference to FIG. 8, the TDL 100 interfaces with a mobile platform network 116. Content from the TDL is transferred to one or more mobile platform servers 802 and/or one or more media servers 806. The management terminal 808 allows an individual on the mobile platform to interact with the TDL 100 in order to request an update of cryptographic keys or initiate diagnostics. If the individual requests updated cryptographic keys, the TDL 100 accesses an ISP 616 via the wireless network to request or send the updated cryptographic keys.

Figure 9:
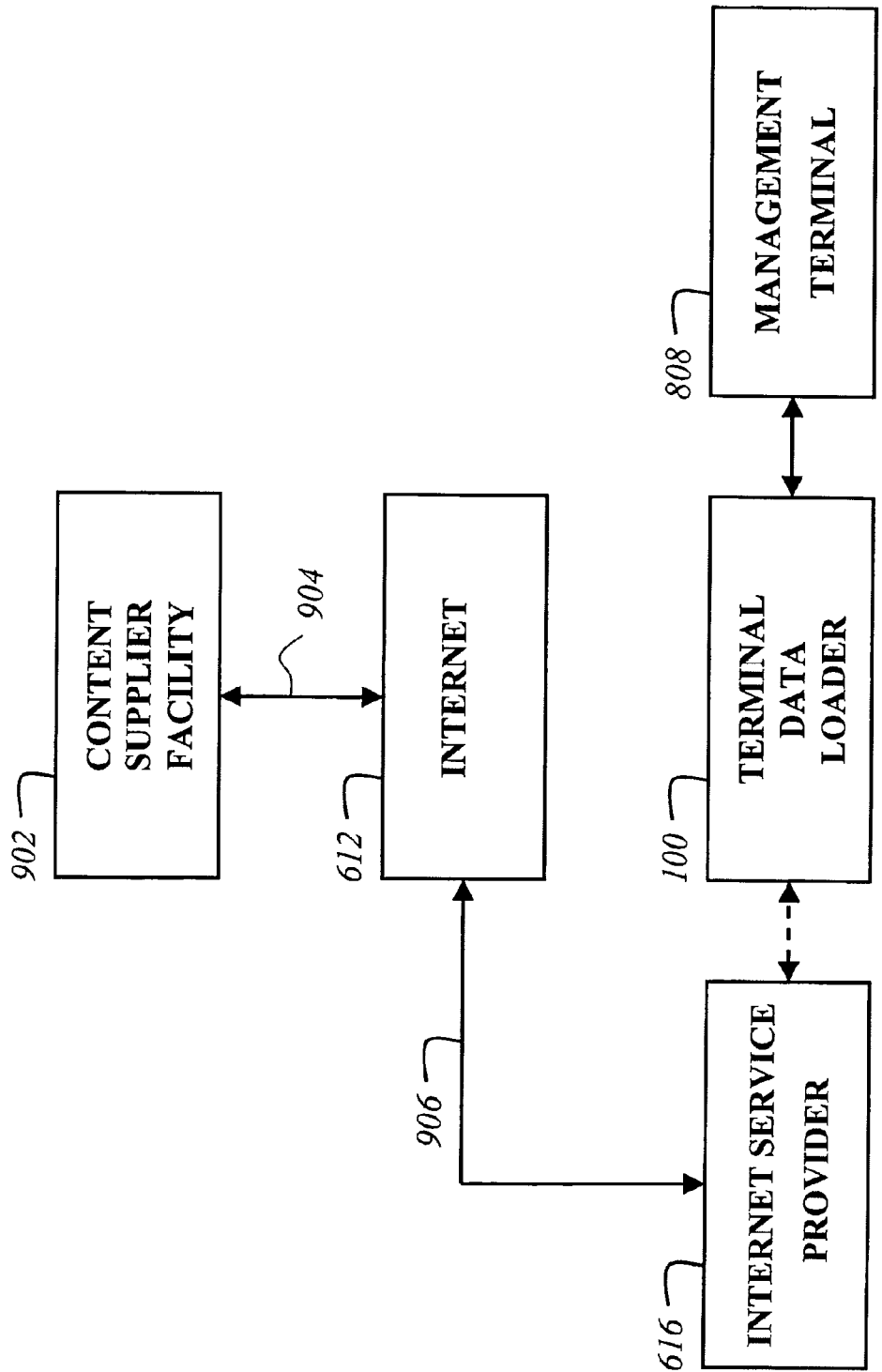
FIG. 9 is a block diagram of the cryptographic key interface system used for the request and receipt of new cryptographic keys.

In reference to FIG. 9, updating cryptographic keys is described. The cryptographic keys may be updated manually or automatically. To update cryptographic keys manually, an individual enters a command to the management terminal 808 requesting the TDL 100 to generate a new public/private key pair. The new public key will be used by a content supplier facility 902 to encrypt the content key associated with the encrypted content on one or more media elements 104 for use with the particular TDL 100 having the particular physical key 212 and making the request. The new public key can be transferred to the content supplier facility 902 in a variety of ways, either through the wireless network 306 where the TDL 100 contacts an accessible ISP 616 using the wireless communications unit 302, by the individual reading the new public key from a display on the management terminal 808 and reporting the information directly to the content supplier facility 902, by courier, or by some other appropriate means. The content supplier facility 902 encrypts one or more content keys using the new public key. The content supplier facility 902 then transports the newly encrypted content keys to the requesting TDL 100.

To generate new cryptographic keys automatically, the TDL 100 receives a command via the wireless network to generate a new public/private key pair. The new public key is similarly exported to the content supplier facility 902. The content supplier facility 902 or a fleet manager can request that a particular TDL use updated keys by sending an automatic e-mail request to the TDL 100. The request for a key update can take the form of an internet e-mail to a specified address which identifies the particular TDL 100 making the request or can be an instant message to a particular resource on the internet. The content supplier facility 902 then uses this new public key to encrypt the content key associated with media associated with the particular TLD 100. The content supplier facility 902 receives the request from the TDL 100 and generates one or more new content keys. The new keys can be sent via e-mail or instant message in similar fashion. Alternatively, the newly encrypted content key can be distributed with the media element, or may be delivered via the wireless network 306 to the requesting TDL 100. Alternatively, a collection of encrypted content keys may be distributed as a part of a key-ring. The key-ring contains one or more content keys encrypted using one or more public keys corresponding to a plurality of physical keys 212 distributed in the fleet. In this case, a particular TDL 100 receiving encrypted media and a key-ring of encrypted content keys will use a look-up method to determine the proper encrypted key corresponding to the particular physical key 212. This distribution of encrypted content keys on a key-ring allows more economical management of content delivery since copies of a media element can be utilized by different TDL by accessing the appropriate cryptographic key on the key-ring. However, distributing the encrypted content keys separately from the actual content media element 104 has advantages from a security standpoint since the media and the content keys are transported separately.

The physical key 212 may be used for the creation and secure storage of private keys that comply with the Rivest-Shamir-Adleman (RSA) public-key cryptosystem, for example. Each physical key 212 is given a unique, internal private key that is not accessible from outside the physical key 212. The content on a media element 104 is encrypted with a content key, while the content key is encrypted with the public key associated with a particular TDL 100. When the encrypted media element 104 is supplied to the particular TDL 100, the internal private key is used to decrypt the encrypted content key, while the content key is then used to decrypt the encrypted content. Therefore, the content is protected using two layers of encryption, so that the content encryption keys are passed in a secure manner to the specified TDL 100. The security processor unit 204 preferably processes both the RSA keys for use in decrypting the content decryption keys as well as decrypting the content with the decrypted content key. Because the TDL decrypts media data content in real-time as it comes off the transportable media element 104, the content never needs to be transported to the aircraft in an unsecured manner.

Those skilled in the art will appreciate that various adaptations and modifications of the just-described preferred embodiments can be configured without departing from the scope and spirit of the invention. Therefore, it is to be understood that, within the scope of the amended claims, the invention may be practiced other than as specifically described herein.

What is claimed is:

1. An aircraft terminal data loader system comprising:
a hardware media drive configured to access data stored on a transportable non-transitory media element;
a control processor unit comprising a computer with a tangible, non-transitory memory storing software, the control processor unit coupled with the hardware media drive and the control processor unit configured to exchange the data with an aircraft network;
a wireless communication unit comprising a wireless transceiver, coupled with the control processor unit, and the wireless communication unit configured to provide the control processor unit a direct tri-band low-bandwidth wireless bi-directional internet connection with an in-flight entertainment (IFE) management computer system; and
wherein the control processor unit is further configured to managean exchange of the data with the aircraft network in response to at least one of (a) an information signal exchanged with the IFE management computer system over the wireless connection, and (b) insertion of the transportable non-transitory media element into the hardware media drive.

2. The terminal data loader system of claim 1, wherein the wireless communication unit is further configured to provide the wireless connection via a cellular channel.

3. The terminal data loader system of claim 2, wherein the cellular channel comprises a Global System for Mobile (GSM) link.

4. The terminal data loader system of claim 3, wherein the GSM comprises a link selected from a group consisting of a Circuit Switched Data (CSD) link, and a General Packet Radio Service (GPRS) link.

5. The terminal data loader system of claim 1, wherein the information signal comprises off-load data when the control processor unit is in response to the information signal.

6. The terminal data loader system of claim 5, wherein the off-load data comprises a media content delivery status.

7. The terminal data loader system of claim 5, wherein the off-load data comprises at least one of a built-in-test operation performed, and a built-in-test equipment log.

8. The terminal data loader system of claim 5, wherein the off-load data comprises at least one of a maintenance record, an equipment failure list, and equipment profile information.

9. The terminal data loader system of claim 5, wherein the off-load data comprises at least one of a time on the ground, a time at the gate, a crew order, an accident report, and surveillance data.

10. The terminal data loader system of claim 5, wherein the off-load data comprises at least one of a transaction, a customs declaration, a customer's selection, a passenger message, and a manifest.

11. The terminal data loader system of claim 5, wherein the off-load data is stored on the transportable non-transitory media element.

12. The terminal data loader system of claim 1, wherein the information signal comprises on-load data when the control processor unit is in response to the information signal.

13. The terminal data loader system of claim 12, wherein the on-load data comprises at least one of a digital content, a poster image, an aircraft operation information, and passenger information.

14. The terminal data loader system of claim 12, wherein the on-load data comprises at least one of a media file, a profile list based on licensing of content, and a content decryption key.

15. The terminal data loader system of claim 12, wherein the on-load data comprises a programming change.

16. The terminal data loader system of claim 12, wherein the on-load data is stored on the transportable non-transitory media element.

17. The terminal data loader system of claim 1, wherein the control processor unit is further configured, when in response to the information signal, to exchange the information signal with the IFE management computer system in real-time.

18. The terminal data loader system of claim 1, wherein the wireless communication unit comprises a discrete hardware component with respect to the control processor unit.

19. The terminal data loader system of claim 1, further comprising a security processor unit having a microprocessor to decrypt encrypted content based on a cryptographic key.

20. The terminal data loader system of claim 19, further comprising a physical key to produce the cryptographic key in response to a request from the control processor unit.

21. The terminal data loader of claim 1, further comprising a hardware discrete unit to detect a sensor signal from a physical sensor, and wherein the control processor unit is further configured to establish the wireless connection in response to the sensor signal.

22. An in-flight entertainment system, comprising:
at least one aircraft comprising a terminal data loader system, the terminal data loader having:
a hardware media drive configured to access data stored on a transportable non-transitory media element;
a control processor unit comprising a computer with a tangible, non-transitory memory storing software, the control processor unit coupled with the hardware media drive and the control processor unit configured to exchange the data with an aircraft network;
a wireless communication unit comprising a wireless transceiver, coupled with the control processor unit, and the wireless communication unit configured to provide the control processor unit a direct tri-band low-bandwidth wireless bi-directional internet connection with an in-flight entertainment (IFE) management computer system; and wherein the control processor unit is further configured to manage an exchange of the data with the aircraft network in response to at least one of (a) an information signal exchanged with the IFE management computer system over the wireless connection, and (b) insertion of the transportable media element into the hardware media drive;

a hardware web-based internet interface configured to allow the IFE management computer system to access the terminal data loader system.

23. The system of claim 22, wherein the at least one aircraft is a member of a fleet of aircraft, where each aircraft of the fleet comprises a terminal data loader system.

24. The system of claim 23, wherein the hardware web-based internet interface is further configured to allow a data exchange between the fleet of aircraft and the IFE management computer system.

25. The system of claim 24, wherein the hardware web-based internet interface is further configured to present a report to the IFE management computer system based on the exchanged data.

26. The system of claim 22, wherein the hardware web-based internet interface is further configured to allow the IFE management computer system to manage at least one of a cryptographic key update, a programming change, and a content delivery.

* * * * *